(12) United States Patent
Music

(10) Patent No.: US 7,554,524 B2
(45) Date of Patent: Jun. 30, 2009

(54) DATA ACQUISITION SYSTEM

(75) Inventor: Leslie D. Music, Federal Way, WA (US)

(73) Assignee: Advanced Management Systems, Inc., Federal Way, WA (US)

( * ) Notice: Subject to any disclaimer, the term of this patent is extended or adjusted under 35 U.S.C. 154(b) by 375 days.

(21) Appl. No.: 11/344,608

(22) Filed: Feb. 1, 2006

(65) Prior Publication Data

US 2006/0173801 A1 Aug. 3, 2006

Related U.S. Application Data

(60) Provisional application No. 60/649,944, filed on Feb. 3, 2005.

(51) Int. Cl.
*G09G 5/00* (2006.01)
(52) U.S. Cl. .................... 345/156; 703/1; 715/771; 715/778
(58) Field of Classification Search ................ 345/156, 345/173; 703/1; 715/771, 778, 798
See application file for complete search history.

(56) References Cited

U.S. PATENT DOCUMENTS

| | | | | |
|---|---|---|---|---|
| 4,257,164 A * | 3/1981 | Task et al. ........... | 33/1 N |
| 5,757,361 A * | 5/1998 | Hirshik ............... | 345/156 |
| 5,841,906 A * | 11/1998 | Saito ................. | 382/203 |
| 6,778,871 B2 * | 8/2004 | Holman et al. ........ | 700/98 |
| 7,145,554 B2 * | 12/2006 | Bachmann ............ | 345/173 |
| 2002/0063696 A1 * | 5/2002 | Kubo et al. ........... | 345/173 |
| 2003/0036889 A1 * | 2/2003 | Goodman et al. ...... | 703/1 |
| 2008/0082241 A1 * | 4/2008 | Meiners et al. ....... | 701/50 |

* cited by examiner

*Primary Examiner*—Amare Mengistu
*Assistant Examiner*—Koosha Sharifi
(74) *Attorney, Agent, or Firm*—Christensen O'Connor Johnson Kindness PLLC

(57) ABSTRACT

Aspects of the present invention are directed to efficiently and accurately inputting data into a computer using a digital protractor. In accordance with one embodiment, a method is provided for inputting data into an application program installed on the computer when an event is generated using the digital protractor. More specifically, the method includes identifying a control on the digital protractor that was activated to generate the event. When the identity of the control is known, the event data is processed into a format that is accepted by an application program. Then, the method causes the processed data to be stored in a location on the computer that is accessible to the application program.

17 Claims, 4 Drawing Sheets

DATA ACQUISITION SYSTEM

CROSS-REFERENCE TO RELATED APPLICATION

This application claims the benefit of U.S. Provisional Patent Application No. 60/649,944, filed Feb. 3, 2005, the benefit of which is hereby claimed under 358 U.S.C. § 119.

FIELD OF THE INVENTION

The present invention relates generally to data acquisition systems that are used to input data into a computer. More specifically, the present invention relates to data acquisition systems for inputting data using a non-conventional input device.

BACKGROUND

Increasingly, software applications executed by computers are employed to complete tasks that were previously performed by other machines or manually by people. In this regard, a variety of software applications are currently available to assist in performing a range of tasks including word processing, money management, architectural design and/or manufacturing, etc. In order for tasks to be completed by these and other types of software applications, at least some data is typically input by a user. For example, conventional input devices such as a keyboard, mouse, etc., are included with modern computers so that data may be input into the different software applications available to a user.

In some software applications, information presented on a drawing is input into the computer by a user employing a conventional input device. In these types of systems, an application program processes the input and generates output that assists a user in a variety of ways. For example, some application programs require users to extract information presented on drawings (e.g., blueprints, construction plans, architectural illustrations, and the like) that depict a structure scheduled to be constructed. When the necessary data is entered, the application program processes the data and generates output that describes attributes of the component parts (e.g., type, quantity, etc.) that need to be manufactured to build the structure. Obviously, in this example, accurately extracting and inputting the data into a computer is important as the output produced may, and typically will, be used to make business decisions.

A software application that obtains data extracted from a drawing may be used to make decisions in a variety of contexts. For example, manufacturers or other business entities typically compete in a process known as bidding to acquire potential business. The process of bidding generally includes extracting information from a drawing to determine, among other things, attributes of a structure depicted in the drawing. Since the bidding process is competitive and the results uncertain, it is important to minimize the cost and effort of obtaining this type of data. For example, if mistakes are made in obtaining data used in the bidding process, a user may inaccurately set the price of components that will be manufactured. Moreover, if mistakes are made and a bid is accepted, the wrong components may be manufactured and/or structures that do not comply with specifications depicted in the drawings may be built.

The data used by some software applications may not be accurately entered using conventional input devices or may only be entered through a labor-intensive and time-consuming process. For example, some software applications require a user to identify the angular relationship between two or more elements represented on a drawing. In existing systems, a user typically employs a manual tool, such as a protractor, to measure an angle between the elements. When the angle is known, the user enters a numeric value on a keyboard or similar device to input a value for the measured angle. However, extracting information from a drawing with a manual protractor is prone to errors. In this regard, manual protractor calculations are subject to a variety of error sources, such as lack of protractor precision, manual placement errors, human visual interpretation, and transcription errors. Moreover, the above-described process for extracting information from a drawing and entering the data into a computer is labor intensive and time-consuming.

The example provided above merely describes one type of data input into a software application using an error-prone and labor-intensive process. However, those skilled in the art and others will recognize that other types of data may be input into a computer using the same or similar process, and the description provided above should be construed as exemplary and not limiting. More generally, this Background Section is provided to introduce a selection of concepts in a simplified form and is not intended to identify key features of the claimed subject matter, nor is it intended to be used as an aid in determining the scope of the claimed subject matter.

SUMMARY

Generally described, aspects of the present invention are directed at efficiently and accurately inputting data into a computer using of a non-conventional input device (hereinafter referred to as a "digital protractor"). In accordance with one embodiment, a method is provided for inputting data into an application program installed on the computer when an event is generated by the digital protractor. More specifically, the method includes identifying a control on the digital protractor that was activated to generate the event. When the identity of the control is known, the event data is processed into a format that is expected by an application program. Then, the method causes the processed data to be stored in a location on the computer that is accessible to the application program. As a result, the application program is able to generate the desired output when a user inputs data using the digital protractor instead of a conventional interface on the computer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is generally directed to a system, method, and apparatus for inputting data into a computer. In this regard one aspect of the present invention is a digital protractor configured to accept input extracted from a drawing (e.g., blueprint, construction plan, architectural illustration, and the like). For example, in one embodiment, the digital protractor includes a touch-sensitive panel suitable to generate electronic signals when contacted by the user. As a user interacts with the touch-sensitive panel, the electronic signals are forwarded from the digital protractor to an application program that accepts data represented in the signals. In this regard, the application program may process the data and/or apply rules to generate the desired output. By way of example only, the digital protractor and an associated application program may automatically calculate angles and degree information between elements on a drawing without requiring significant user skill or effort. As a result, data represented on a drawing is input into a computer in a way that reduces or eliminates data entry errors and is more efficient than existing systems.

Although the present invention will be described primarily in the context of extracting data from a drawing to identify attributes of a drainage system, those skilled in the art and others will appreciate the present invention is also applicable in other contexts. In any event, the following description first provides a general overview of a data acquisition system comprised of both hardware and software components that implement aspects of the present invention. Then a routine for processing data input into the computer using the digital protractor is described. The examples provided herein are not intended to be exhaustive or to limit the invention to the precise forms disclosed. Similarly, any steps described herein may be interchangeable with other steps or combinations of steps in order to achieve the same result. Accordingly, the embodiments of the present invention described below should be construed as illustrative in nature and not limiting.

Figure 1:
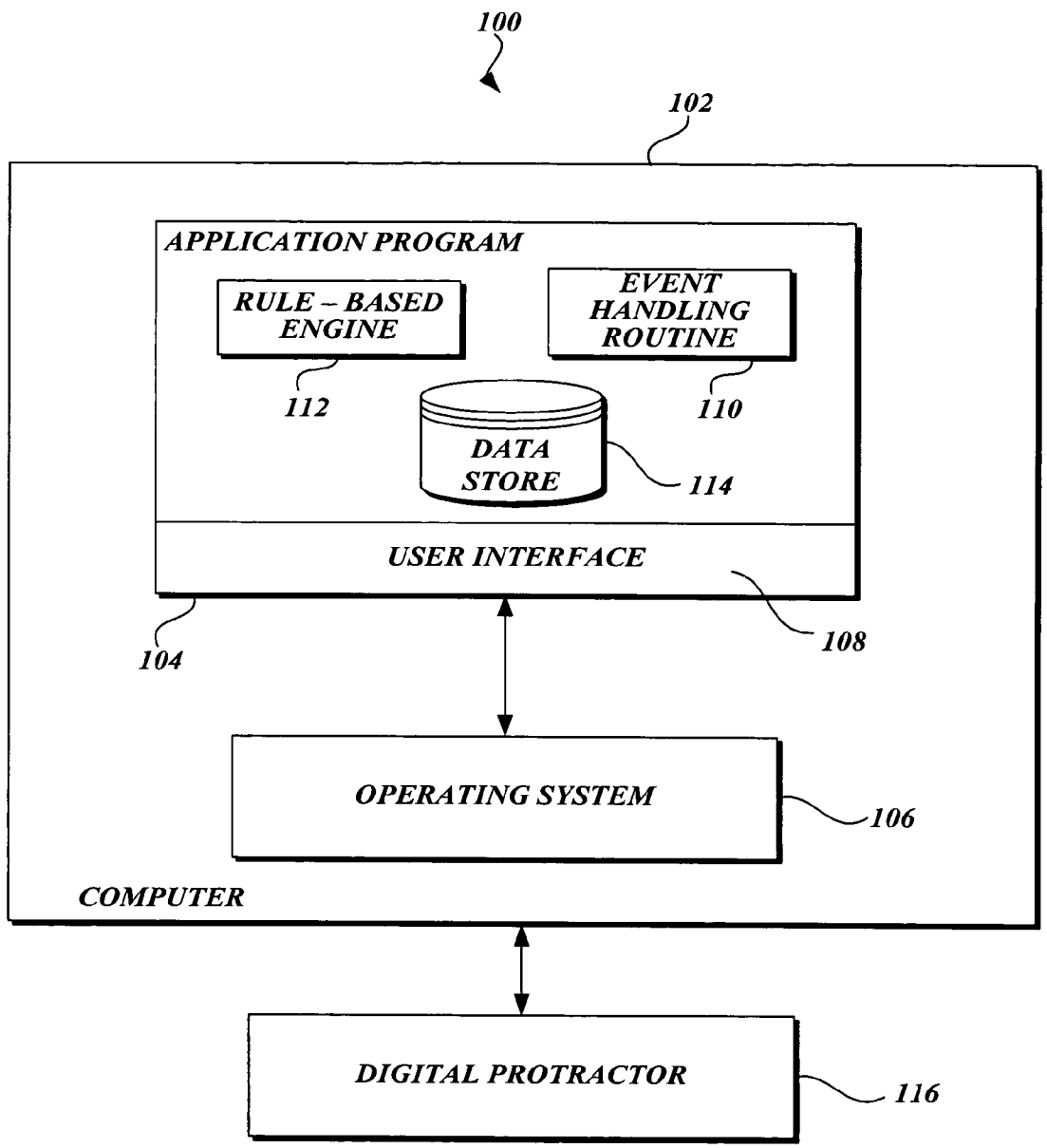
FIG. 1 is a pictorial depiction of an exemplary data acquisition system with hardware and software components configured to implement aspects of the present invention.

Now with reference to FIG. 1, a data acquisition system 100 comprised of both hardware and software components suitable to implement aspects of the present invention will be described. The data acquisition system 100 depicted in FIG. 1 includes a computer 102 which may be any one of a variety of devices including, but not limited to, personal computing devices, server-based computing devices, mini- and mainframe computers, laptops, limited resource computing devices such as personal digital assistants ("PDAs") and cell phones, or other electronic devices having some type of memory. For ease of illustration and because it is not important for an understanding of the present invention, FIG. 1 does not show the typical components of many computers, such as a central processing unit ("CPU"), memory, a display, etc. However, as illustrated in FIG. 1, the computer 102 does include an application program 104 and an operating system 106. Moreover, the application program 104 includes a user interface 108, an event handling routine 110, a rule-based engine 112, and a data store 114.

In an actual embodiment, aspects of the present invention are integrated with an application program entitled "Stack-It Manhole and Catch Basin Estimating System," that is commercially available from Advanced Management Systems, Inc., located in Federal Way, Washington. However, those skilled in the art and others will recognize that the subject matter claimed herein is applicable in other contexts. For example, aspects of the present invention may be applied in any number of currently available or yet to be developed application programs. In any event, in the exemplary embodiment of the data acquisition system 100 depicted in FIG. 1, the application program 104 obtains data that describes attributes of underground storage structures used in sanitary and storm water drainage systems. In this regard, the application program 104 causes the rule-based engine 112 to process the data input by a user to generate output needed in estimating, bidding, and manufacturing component parts and fully assembling a drainage system. For example, the type of output produced in this example may include, but is not limited to: (1) an itemization of the component parts needed to construct a drainage system, (2) manufacturing requirements of the component parts in a drainage system, and (3) attributes of the drainage system that are calculated or otherwise not readily accessible from a drawing. Among other things, the output produced may be used to estimate costs and/or provide personnel with specifications for building structures included in a drainage system.

As mentioned above, the application program 104 includes a rule-based engine 112. Since much of the functionality of the rule-based engine 112 is not important for an understanding of the present invention, it will not be described in detail here. However, generally described, the rule-based engine 112 is the component of the application program 104 responsible for applying rules to generate output needed in manufacturing and/or assembling a drainage system. For example, aspects of the present invention cause input that defines parameters of a structure included in a drainage system to be stored in the data store 114. These parameters may include, but are not limited to, a structure type, a diameter of the structure, elevations for the structure, elevations and angles for each pipe entering the structure, and the like. In accordance with one embodiment, the rule-based engine 112 retrieves data from the data store 114, applies a set of rules to the data, and generates output that identifies component parts and manufacturing requirements for building a structure. More specifically, and by way of example only, the rule based engine 112 generates output that describes attributes of a completed structure including the parts required for assembly, location of holes that need to be cut, attributes of components that connect to the structure, and the like.

The application program 104 depicted in FIG. 1 includes a user interface 108. Those skilled in the art and others will recognize that a user interface is an input/output ("I/O") system typically characterized by the use of graphics on a computer display (not shown) to interact and communicate with a computer user. With existing systems, a user interacts with a user interface by employing a conventional input device, such as a keyboard or mouse to enter alphanumeric characters or relocate a pointer to generate pointer selection events (e.g., mouse clicks). The application program 104 illustrated in FIG. 1 includes a user interface 108 capable of accepting input from a user with conventional input devices. In this regard, the user interface 108 is configured to display a "build screen" to a user that presents interface controls arranged in the same orientation and manner as controls presented on the digital protractor 116 (described below). However, instead of inputting data into the "build screen" provided by the user interface 108 with a conventional input device, a user may input the data using the digital protractor 116. As described in further detail below, in instances when a user employs the digital protractor 116, the data input may be presented on the "build screen" to provide the user with feedback.

As further illustrated in FIG. 1, the computer 102 includes an event handling routine 110. Since one embodiment of the event handling routine 110 is described in further detail below with reference to FIG. 4, the routine 110 will not be described in detail here. However, generally described, the event handling routine 110 is a software component that processes data input with the digital protractor 116 so that the application program 104 may generate the appropriate output. For example, the event handling routine 110 identifies different types of events that are generated using the digital protractor 116 and causes data that describes these events to be stored in a location (e.g., the data store 114) that is accessible to the rule-based engine 112. Moreover, the data processing routine 114 also interacts with the user interface 108 in various respects. For example, data processed by the event handling routine 110 may be forwarded to the user interface 108 and displayed to the user.

As further illustrated in FIG. 1, the computer 102 includes an operating system 106, which may be a general purpose operating system such as a Microsoft® operating system, a Linux® operating system, or a UNIX® operating system. Alternatively, the operating system 106 may be specifically designed for a limited resource computing device, such as a Palm® operating system, a Windows® CE operating system, etc. In any event, those skilled in the art and others will recognize that the operating system 106 is responsible for managing hardware resources and input devices on the computer 102. For example, in one embodiment, a user interacts with the digital protractor 116 to generate input into the computer 102. In this regard, the operating system 106 receives and forwards the input received by the digital protractor 116 to the application program 104. Also, those skilled in the art and others will also recognize that the operating system 106 may interact with a program commonly known as a driver (not illustrated) to accept signals generated by the digital protractor 116.

In addition to the computer 102, the data acquisition system 100 illustrated in FIG. 1 also includes a digital protractor 116. However, since different embodiments of the digital protractor 116 will be described below with reference to FIGS. 2 and 3, a detailed description of the digital protractor 116 will not be provided here.

FIG. 1 is a simplified example of data acquisition system 100 that includes an exemplary computer 102 with components that are suitable to implement aspects of the present invention. However, actual embodiments of the computer 102 will have additional components not illustrated in FIG. 1 or described in the accompanying text. Also, FIG. 1 shows one component architecture for one computer 102 that is suitable to implement aspects of the present invention. However, those skilled in the art and others will recognize that the present invention may be practiced in many other computer system configurations without departing from the scope of the claimed subject matter.

Now with reference to FIG. 2, one embodiment of the digital protractor 116 briefly mentioned above with reference to FIG. 1 will be described in further detail. In this regard, the digital protractor 116 illustrated in FIG. 2 includes a touch-sensitive panel 202, a handle 204, a physical connection system 206, and a stylus 208. Generally described, the digital protractor 116 is a non-conventional input device well-suited for inputting certain types of data into a computer. More specifically, in one embodiment, components of the digital protractor 116 provide a mechanism to easily extract and forward different types of data from a drawing into an application program that is configured to process the data.

In accordance with one embodiment, the touch-sensitive panel 202 is a commercially available device originally intended to provide users of laptop computers with the ability to use a direct input device (e.g., the stylus 208) to interact with a user interface. More specifically, in this embodiment, the touch-sensitive panel 202 is one component of a commercially available kit that is available from Keytek, Inc., entitled "MAGIC TOUCH, KTMT 1214-USB."

The touch-sensitive panel 202 is modified in a number of respects from its original configuration in order to be integrated into the data acquisition system 100 described above with respect to FIG. 1. For example, components intended to mount the touch-sensitive panel 202 to a laptop computer are removed. Moreover, since the digital protractor 116 is intended to be mobile, the handle 204 is added to allow a user to easily move the digital protractor 116 between different locations. As described in more detail below, a user may position the digital protractor 116 so that information on a drawing is capable of being viewed through the touch-sensitive panel 202. Then, the user may employ the stylus 208 to interact with the touch-sensitive panel 202 and identify one or more locations represented on a drawing. The handle 204 provides a mechanism for moving the digital protractor 116 to different locations and adds rigidity to the touch-sensitive panel 202.

Figure 2:
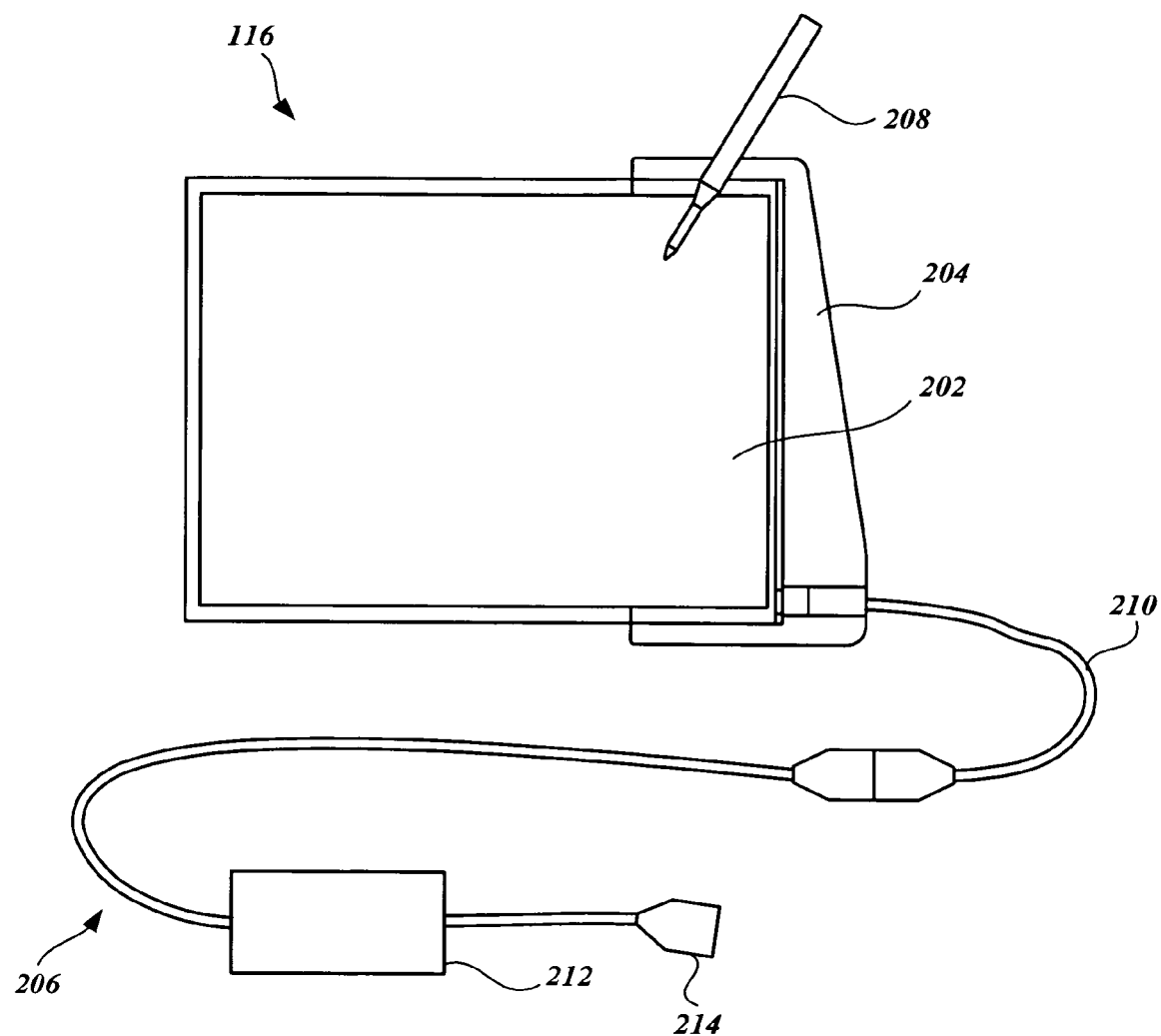
FIG. 2 is a pictorial depiction of an exemplary digital protractor suitable to obtain data from a user and input the data into a computer.

The physical connection system 206 depicted in FIG. 2 is configured to establish a communication link between the digital protractor 116 and a computer, such as the computer 102 described with reference to FIG. 1. In one embodiment, the physical connection system 206 includes a cable disconnect 210, control electronics 212, and a port connector 214. The cable disconnect 210 forwards signals generated at the touch-sensitive panel 202 to the control electronics 212 which processes the signals to generate output that may be input into the computer. In this regard, the connector 214 is configured to connect and forward data from the control electronics 212 to the appropriate computer input port. For example, in one embodiment, the connector 214 is a Universal Serial Bus ("USB") connector that connects the control electronics 212 to an I/O port on the computer 102 (FIG. 1) that adheres to the USB standard. However, the composition of the physical connection system 206 illustrated in FIG. 2 should be construed as exemplary and not limiting. Those skilled in the art and others will recognize that other types of physical connection systems may be used to connect the digital protractor 116 to a computer without departing from the scope of the claimed subject matter.

When a user causes the stylus 208 to contact the touch-sensitive panel 202, values of x and y coordinates that identify the location contacted are forwarded from the digital protractor 116 to the application program 104 (FIG. 1). In accordance with one embodiment, the application program performs calculations to quantify various relationships between locations (e.g., coordinate positions) identified by the user. For example, a user may cause computer input that represents a first and second coordinate positions to be input into the application program 104. Based on the obtained coordinate positions, the application program 104 calculates the angular relationship and distance between the locations. As a result, the user is not required to employ manual tools, such as a protractor, ruler, etc., to extract information that is represented on a drawing. Instead, a user may place the digital protractor 116 over a drawing, identify locations represented on the drawing by interactions with the touch-sensitive panel 202 (FIG. 2) and have the angular relationship and/or distance between the locations automatically calculated.

Now with reference to FIG. 3, one specific embodiment of the digital protractor 116 that obtains data used by the software application 104 (FIG. 1) will be described. Similar to the description provided above with reference to FIG. 2, the digital protractor 116 depicted in FIG. 3 includes a touch-sensitive panel 202, a handle 204, a physical connection system 206, and a stylus 208. However, in this embodiment, a polymer overlay that presents a printed image adheres to the touch-sensitive panel 202 and separates the touch-sensitive panel 202 into two primary regions: namely a transparent region 302 and an opaque region 304. Moreover, the opaque region 304 is subdivided into a keypad 306, an input selector area 308, and a feedback selector area 310. Collectively, the transparent region 302 and the opaque region 304 replicate interface controls on the "build screen" provided by the user interface 108 (FIG. 1). By presenting interface controls with the same format and orientation on both the digital protractor 116 and the user interface 108, the present invention provides users with a consistent "look and feel." As a result, data entry errors are prevented since the ways data may be entered into the data acquisition system 100 (FIG. 1) is consistent regardless of the input device being used.

Figure 3:
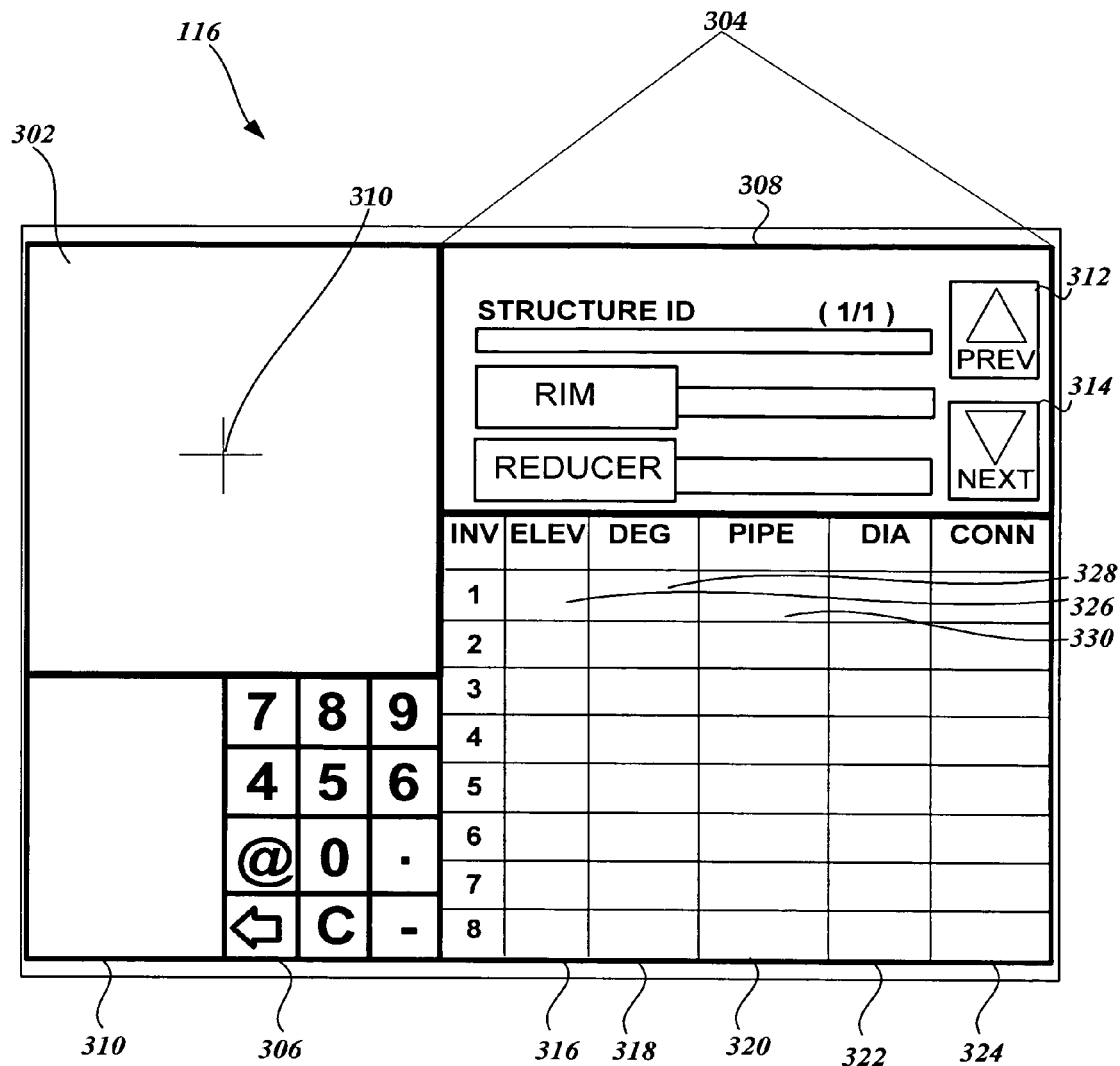
FIG. 3 is another pictorial depiction of the exemplary digital protractor with controls suitable to generate different types of events that are handled by the data acquisition system depicted in FIG. 1.

The embodiment of the digital protractor 116 depicted in FIG. 3 provides one way for data that describes structures and/or other components of a drainage system to be input into the application program 104 (FIG. 1). In this regard, a user may position the digital protractor 116 on the surface of a drawing so that structure(s) represented on the drawing are visible through the transparent region 302. In one exemplary embodiment, the user aligns the center of a selected structure with markings on the polymer overlay that identify a point of origin 310. In any event, when used, the digital protractor 116 provides a way for users to generate different types of events to enter data that describe a selected structure including, but not limited to input of (1) selection events, (2) numeric entry events, (3) location identifying events, and (4) feedback selection events.

Controls presented on the input selector area 308 depicted in FIG. 3 allow a user to generate input selection events for selecting a structure in which data will be entered. In this regard, the input selector area 308 includes the navigation boxes 312 314 for selecting and navigating between structures included in a drainage system. For example, with the navigation boxes 312 and 314, a user may select a first structure, cause data that describes the structure to be entered, and activate the "next" navigation box 314 to select the next appropriate structure. However, a user does not need to proceed linearly when selecting and entering data that describes structures included in a drainage system. Instead, the navigation boxes 312 and 314 allow a user to traverse between structures and enter date using a non-linear technique.

The digital protractor 116 illustrated in FIG. 3 provides controls for generating input selection events to identify attributes of components associated with a selected structure. For example, the input selector area 308 depicted in FIG. 3 includes the columns entitled "ELEV" 316, "DEG" 318, "PIPE" 320, "DIA" 322, and "CONN" 324. In this exemplary embodiment, each row associated with the columns 316, 318, 320, 322, and 324, represents a component, such as a pipe, that connects to the selected structure. With the stylus 208 (FIG. 2), a user may identify a specific pipe and enter data that describes the relationship between the pipe and the selected structure. For example, after contacting the box 326 under the "ELEV" column 316, a user may enter the elevation that a first pipe connects to the selected structure using the keypad 306 to generate numeric entry events. Obviously, depending on the composition of a drainage system, a user may enter elevation data using the same technique for additional pipes that connect to the selected structure.

The digital protractor 116 illustrated in FIG. 3, also provides controls for generating location identifying events that prevent a user from having to perform certain manual calculations. For example, after selecting the box 328 in the "DEG" column 318, the user may identify the angle the first pipe connects to the selected structure by interacting with the keypad 306 to enter numeric data after measuring the angle using a manual tool. However, in a preferred embodiment, the user generates location identifying events that allow an angle between two locations to be automatically calculated without requiring the use of a manual tool such as a protractor. In this regard, if the digital protractor 116 is positioned on a drawing so that the selected structure is located at the point of origin 310, the user may press the stylus 208 (FIG. 2) on the line that represents the pipe as seen through the transparent region 302. As described in further detail below, the event handling routine 110 (FIG. 1) is notified when this type of location identifying event is generated. Moreover, the event handling routine 110 uses the event data to automatically calculate the angle at which the pipe enters the selected structure.

The digital protractor 116 illustrated in FIG. 3 also provides controls for generating feedback selection events. As described briefly above, the application program 104 (FIG. 1) processes data input into a computer and provides feedback to the user. For example, when the user inputs elevation and angular data using the digital protractor 116, the application program 104 processes the input and causes the user interface 108 (FIG. 1) to display the values entered on a "build screen." By way of another example, if the user selects the box 330 in the "PIPE" column 320, the application program 104 handles the event and provides feedback to the user. In this regard, handling the event includes identifying a set of selectable pipe categories that may be used in the drainage system for the identified pipe. When known, the user interface 108 (FIG. 1) displays the selectable pipe categories at the location on the "build screen" that corresponds to the feedback selector area 310 on the digital protractor 116. In this example, when the selectable pipe categories are displayed on the "build screen," the user may generate a feedback selection event to select one of the categories by contacting the approximate location on the feedback selector area 310.

The digital protractor 116 depicted in FIG. 3 is configured to obtain other types of data than described above. For example, the "DIA" 322 box and "CONN" 324 box may be activated so that a pipe's diameter and connector type may each be entered into the application program 104 (FIG. 1). Moreover, the input selector area 308 includes controls for entering the "Rim" elevation and/or "Reducer" elevation for a selected structure. However, since this and other types of data may be identified using the same or similar types of techniques that are described above, these techniques will not be described in further detail here.

Generally described, the digital protractor 116 depicted in FIG. 3 is an input device that allows users to generate different types of events including, but not limited to input of (1) selection events, (2) numeric entry events, (3) location identifying events, and (4) feedback selection events. By accepting and handling these events, different types of data may be input into a computer using the digital protractor 116. In the example described with reference to FIG. 3, the digital protractor 116 provides a convenient way to enter data extracted from a drawing that describes structures and other components in a drainage system. However, those skilled in the art and others will recognize that the digital protractor 116 may be configured to obtain other types of data without departing from the scope of the claimed subject matter.

Figure 4:
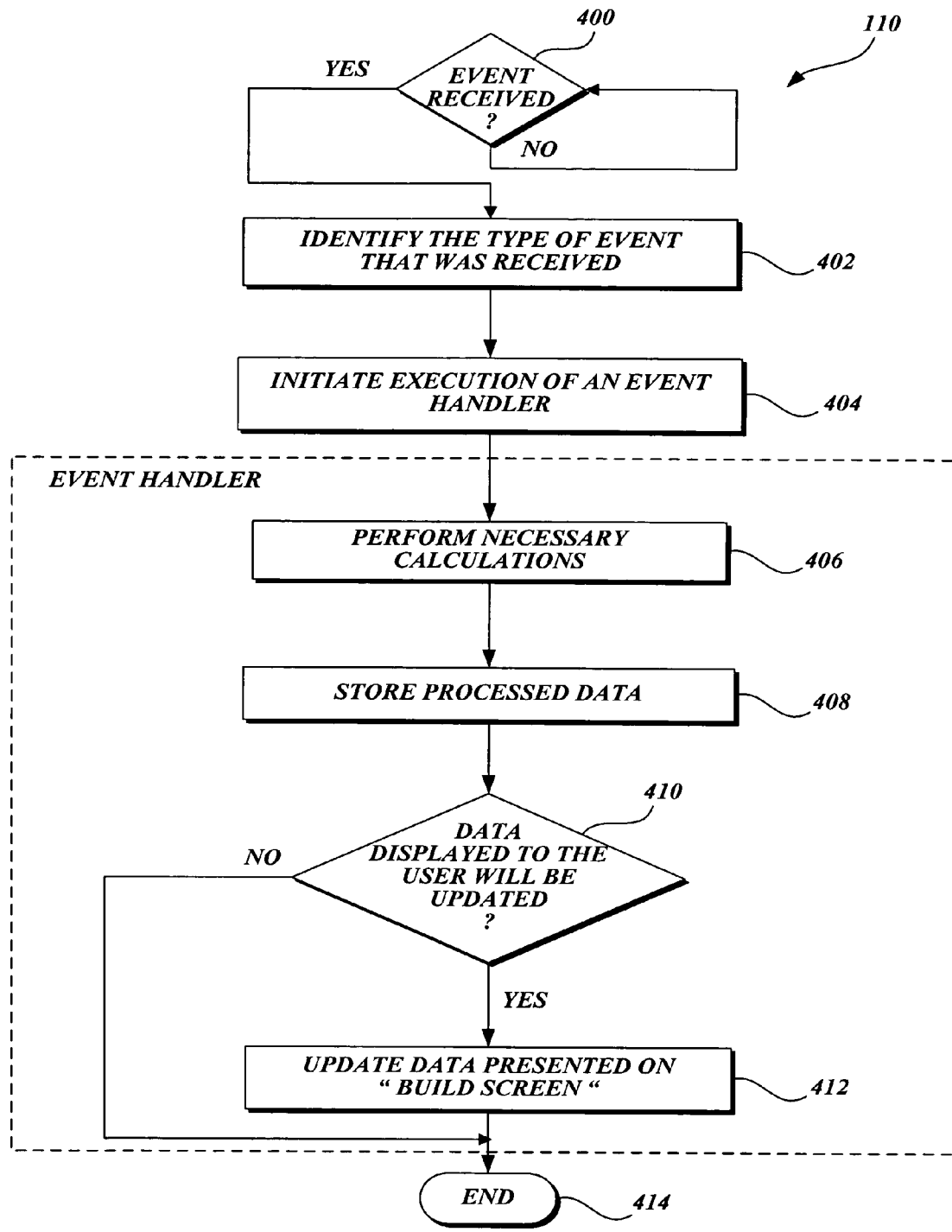
FIG. 4 is a flow diagram of a routine that processes event data generated using a digital protractor and inputs the data into an application program.

Now with reference to FIG. 4, an exemplary embodiment of the event handling routine 110 briefly mentioned above with reference to FIG. 1 will be described in further detail. In accordance with one embodiment, the event handling routine 110 receives notice when an event is generated using the digital protractor 116. More specifically, when a user contacts the touch-sensitive panel 202 (FIG. 2), the event handling routine 110 processes this event by (1) identifying the control that was activated, (2) processing and storing event data, and/or (3) interacting with the user interface 108 (FIG. 1) so that the information available to the user is updated. With continuing reference to FIGS. 1-3 and the accompanying descriptions, an exemplary event handling routine 110 illustrated in FIG. 4 will now be described. As illustrated in FIG. 4, the event handling routine 110 begins at decision block 400, where the routine 110 remains idle until notice of an event is received. As described above with reference to FIG. 3, the user may generate different types of events by interacting with the digital protractor 116. In this regard, when a user causes the stylus 208 to contact the touch-sensitive display 202, event data that includes a 2-tuple of the x-and y-coordinates of the location contacted is transmitted from the digital protractor 116 to an operating system (e.g., the operating system 106) installed on the computer. Then, in this embodiment, the operating system forwards the event data to the application program 104 for processing by the event handling routine 110.

At block 402, the event handling routine 110 identifies the type of event that was received at block 400. As mentioned previously, the digital protractor 116 may include a polymer overlay that displays selectable controls to the user. In this regard, the areas (e.g., coordinate positions) occupied by the available selectable controls are known. Moreover, as described above, the event handling routine 110 obtains a 2-tuple of the x- and y-coordinates for the location on the touch-sensitive panel 202 that was contacted by the user to generate the event received at block 400. By performing a comparison, at block 402, between the location on the digital protractor 116 contacted by the user and the areas occupied by the available selectable controls, the event handling routine 110 identifies the type of event received at block 400. For example, if the user selects the box 328 in the "DEG" column 318 depicted in FIG. 3, the x-y coordinates of the location that was contacted is obtained at block 400. Then a comparison is performed between the location contacted and the areas occupied by the available selectable controls. As a result of this comparison, the event handling routine 110 is able to identify the control that was selected.

At block 404, the event handling routine 110 initiates execution of an appropriate event handler. In accordance with one embodiment, program code contained in event handlers is responsible for processing the event that was identified at block 400. Based on the control that was selected by the user, the event handling routine 110 calls the appropriate event handler at block 404. However, since calling an event handler may be performed using techniques that are generally known in the art, the technique used at block 404 will not be described in further detail here. Moreover, since all of the different aspects of the various event handlers that may be called at block 404 are not important for an understanding of the present invention they will not be described in detail here. Thus, blocks 406-412 are a generalized description of the functionality performed by the event handlers that implement the event handling routine 110.

As illustrated in FIG. 4, at block 406, the event handling routine 110 performs any calculations required to convert event data into a form expected by the application program 104. For example, as mentioned previously, a user may generate location identifying events using the digital protractor 116 that requests an angle to be calculated between two coordinate positions. In this example, the processing performed at block 406 includes calculating a value for an angle between the coordinate positions. However, those skilled in the art and others will recognize that other types of calculations may be performed at block 406 to convert data obtained using the digital protractor 116 into a form expected by the application program 104.

At block 408, the event handling routine 110 causes data obtained using the digital protractor 116 to be stored in a location that is accessible to the rule-based engine 112. As mentioned previously with reference to FIG. 1, the event handling routine 110 may be integrated with an application program 104 that includes a rule-based engine 112. Moreover, the rule-based engine 112 is responsible for applying a set of rules to generate output used in manufacturing and/or assembling a drainage system. In this embodiment, when data is input using the digital protractor 116, the event handling routine 110 stores the data in a location (e.g., the data store 114) that is accessible to the rule-based engine 112. Then, when needed, the relevant data is retrieved from the data store 114 and processed by the rule-based engine 112 to generate the requested output.

As illustrated in FIG. 4, at block 410, the event handling routine 110 determines whether an update of the information currently presented to the user will be performed as a result of the event received at block 400. As mentioned previously, a "build screen" may be presented on a computer display when a user interacts with the digital protractor 116. In this example, the event handling routine 110 determines whether data on the "build screen" needs to be updated to reflect the event received at block 400. As illustrated in FIG. 4, if the data currently presented to the user will not be updated, the event handling routine 110 proceeds to block 414 where it terminates. Conversely, if the data currently presented to the user will be updated, the event handling routine 110 proceeds to block 412.

At block 412, the event handling routine 110 causes the information displayed to the user on the "build screen" to be updated to reflect the event identified at block 400. For example, at block 412 the event handling routine 110 may issue a call to the user interface 108 in order to refresh data that is displayed on "build screen." Then, the user interface issues a query to the data store 114 so that the most up-to-date information received from the user may be presented on the "build screen." Then, the event handling routine 110 proceeds to block 414 where it terminates.

While the preferred embodiment of the invention has been illustrated and described, it will be appreciated that various changes can be made therein without departing from the spirit and scope of the invention.

The invention claimed is:

1. A data acquisition system that employs an input device to obtain data from a user, the data acquisition system comprising:
    a digital protractor operative to generate and forward event data to a computer when contacted by a user;
    a physical connection system that communicatively links the digital protractor to the computer; and
    a computer suitable to execute programs, wherein the programs are stored in a memory of the computer, including:
        an operating system that manages access to event data received from the digital protractor;
        an underground drainage application including a user interface with a plurality of controls configured to accept input utilizing a graphical input device; and
        an event handling routine operative to map the controls of the underground drainage application to a corresponding surface area of the digital protractor and process event data received from the digital protractor including:
  receive a user-generated event from the digital protractor; and
  identify and call an appropriate event handler of the underground drainage application based on the mapping of controls from the underground drainage application to the corresponding surface area of the digital protractor.

2. The system as recited in claim 1, further comprising a data store configured to store data obtained by components of the data acquisition system so that the data may be subsequently retrieved.

3. The system as recited in claim 1, wherein the event handling routine is integrated into an application program configured to generate output that describes attributes of a drainage system.

4. The system as recited in claim 3, wherein the application program includes a rule-based engine that is configured to retrieve data processed by the event handling routine from a data store.

5. The system as recited in claim 4, wherein the rule-based engine is further configured to:
  identify component parts using data obtained using the digital protractor that is mapped to a control of the underground drainage application; and
  provide specifications for assembling structures in the drainage system based on the data obtained using the digital protractor.

6. The system as recited in claim 3, wherein the application program includes a user interface that displays data input into the data acquisition system; and
  wherein the event handling routine is configured to update the data displayed to the user to reflect events generated using the digital protractor.

7. The system as recited in claim 1, wherein the event handling routine is further configured to:
  calculate an angle between two coordinate positions when a location identifying event is received;
  cause the calculated angle to be displayed to the user on a user interface.

8. The system as recited in claim 1, wherein the digital protractor is further configured to accept numeric entry events, feedback selection events, and input selection events.

9. In a computer that is communicatively linked to a digital protractor, a computer implemented method of inputting data into an application program, wherein the application program is stored in a memory of the computer, the method comprising:
  mapping controls of the application program to a corresponding surface area on the digital protractor;
  obtaining a series of events at the digital protractor that includes at least numeric entry events, location identifying events, and feedback selection events;
  processing the event data into a format accepted by the application program that describes attributes of a drainage structure; and
  inputting the event data into the identifying application program;
  wherein inputting the event data includes identifying and calling each of the controls of the application program activated by the received events based on the mapping between controls of the application to the surface area of the digital protractor.

10. The method as recited in claim 9, further comprising updating information available to the user to reflect that the series of events was handled by the application program.

11. The method as recited in claim 10, wherein updating information available to the user includes causing a user interface to:
  obtain the processed event data from a data store; and
  refresh a screen that is displayed when notice of an event is received.

12. The method as recited in claim 9, wherein the application program is configured to:
  obtain data that describes attributes of a structure; and
  apply a set of rules to the data to generate output that:
    identifies component parts needed to build the structure; and
    provides specifications to assemble the structure.

13. The method as recited in claim 9, wherein the digital protractor generates an event and forwards event data to the application program when the user causes contact to be made with a touch-sensitive panel.

14. The method as recited in claim 9, wherein identifying each of the controls in the application that was activated, includes:
  receiving a coordinate position of a location that was contacted; and
  identifying a control that is displayed on a touch sensitive panel at the coordinate position.

15. The method as recited in claim 9, wherein processing event data includes:
  determining whether the event is a location identifying event; and
  if the event is a location identifying event, calculating the angle between two coordinate positions associated with the location identifying event.

16. The method as recited in claim 9, wherein processing the event data includes:
  identifying the type of event that was received; and
  initiating execution of an event handler configured to satisfy the type of event that was received.

17. The method as recited in claim 9, wherein the digital protractor is further configured to accept navigation events.

* * * * *

UNITED STATES PATENT AND TRADEMARK OFFICE
CERTIFICATE OF CORRECTION

PATENT NO. : 7,554,524 B2
APPLICATION NO. : 11/344608
DATED : June 30, 2009
INVENTOR(S) : L. D. Music Page 1 of 1

It is certified that error appears in the above-identified patent and that said Letters Patent is hereby corrected as shown below:

| COLUMN | LINE | ERROR |
|---|---|---|
| 12 (Claim 9, | 4 line 14) | after "data into the" delete "identifying" |

Signed and Sealed this

Twenty-seventh Day of October, 2009

David J. Kappos
*Director of the United States Patent and Trademark Office*